United States Patent
Fu et al.

(10) Patent No.: US 8,640,125 B2
(45) Date of Patent: Jan. 28, 2014

(54) METHOD AND SYSTEM FOR SECURELY INSTALLING PATCHES FOR AN OPERATING SYSTEM

(75) Inventors: Rong Yao Fu, Beijing (CN); Yuan Quan, Beijing (CN); Xia Tian Zhang, Beijing (CN); Shi Wan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 918 days.

(21) Appl. No.: 12/235,781

(22) Filed: Sep. 23, 2008

(65) Prior Publication Data

US 2009/0083727 A1    Mar. 26, 2009

(30) Foreign Application Priority Data

Sep. 26, 2007  (CN) .......................... 2007 1 0161936

(51) Int. Cl.
G06F 9/44 (2006.01)
(52) U.S. Cl.
USPC .......................................... 717/178; 717/168
(58) Field of Classification Search
USPC ........................................................ 717/178
See application file for complete search history.

(56) References Cited

U.S. PATENT DOCUMENTS

| | | | | |
|---|---|---|---|---|
| 5,896,499 A | * | 4/1999 | McKelvey | 726/11 |
| 7,093,287 B1 | * | 8/2006 | Gusler et al. | 726/13 |
| 7,100,202 B2 | * | 8/2006 | Bakke | 726/11 |
| 2003/0069973 A1 | * | 4/2003 | Ganesan et al. | 709/226 |
| 2004/0078599 A1 | * | 4/2004 | Nahum | 713/201 |
| 2004/0210653 A1 | * | 10/2004 | Kanoor et al. | 709/223 |
| 2005/0022010 A1 | * | 1/2005 | Swander et al. | 713/201 |
| 2005/0273841 A1 | * | 12/2005 | Freund | 726/1 |
| 2006/0031430 A1 | | 2/2006 | Lee | |
| 2006/0059542 A1 | * | 3/2006 | Holladay et al. | 726/3 |
| 2006/0195568 A1 | * | 8/2006 | Staurnes et al. | 709/224 |
| 2006/0253555 A1 | * | 11/2006 | Leung | 709/220 |
| 2007/0107043 A1 | * | 5/2007 | Newstadt et al. | 726/2 |
| 2007/0294744 A1 | * | 12/2007 | Alessio et al. | 726/1 |
| 2009/0083727 A1 | * | 3/2009 | Fu et al. | 717/172 |

* cited by examiner

*Primary Examiner* — Don Wong
*Assistant Examiner* — Theodore Hebert
(74) *Attorney, Agent, or Firm* — William Stock; Anne Vachon Dougherty

(57) ABSTRACT

A method and a system for securely installing patches for an operating system, wherein the system comprises a personal firewall, for filtering inbound and outbound network traffic; an operating system update agent, for connecting to an update server via the personal firewall to download patches; a policy manager, for invoking respective policies according to respective stages of the operating system; a stage coordinator, for coordinating the policy manager and the operating system update agent for different stages; and a policy database, for storing respective policies for respective stages of the operating system. With the method and system, the possibility of being infected by malicious software is significantly reduced when downloading patches for the operating system from the Internet.

4 Claims, 3 Drawing Sheets

METHOD AND SYSTEM FOR SECURELY INSTALLING PATCHES FOR AN OPERATING SYSTEM

FIELD OF INVENTION

The invention generally relates to the security of operating systems and in particular to a method and a system for securely installing patches for an operating system.

DESCRIPTION OF THE RELATED ART

Security is always a problem in all mainstream operating systems, and it is especially severe in the Windows® (Windows is a registered trademark of Microsoft) operating system. An unprotected computer operating system without the latest patches installed therein will easily get infected by thousands of mal-ware instances within a few minutes after connecting to the Internet. According to the data from the Internet Storm Center at the US-based SANS Institute, the time period between the connection to the Internet and the infection of mal-ware continues decreasing to a point at which an unprotected computer is not able to download the very patches that would protect the operating system from mal-ware in time, thus the operating system would be infected by mal-ware or viruses when downloading the patches.

A brand new computer, or a computer with an operating system just re-installed, or even a computer without the latest patches installed therein, will encounter the threat of thousands of mal-ware instances when connecting to the Internet and get infected shortly. According to the research of published by Sophos in July 2005, the probability that a computer without the latest patches installed therein getting infected by mal-ware within 12 minutes after connecting to the Internet is around 50 percent. Once infected, it is almost impossible to get the operating system clean without completely re-installing it.

Many worms and viruses exploit the security vulnerabilities of the operating system to attack/infect the system. Thus it is very important to protect the operating system from worms and viruses by updating the operating system with the latest patches. However, in order to get the latest patches, one usually needs to connect the computer to the Internet. The computer system will probably get infected during the updating process. Therefore, there are a lot of problems when distributing security patches via unreliable and insecure networks.

Thus, there is need for securely installing patches for the operating system so that it will not get infected by mal-ware.

Nowadays, more and more computers use personal firewalls to protect the operating system from mal-ware such as worms and viruses. A personal firewall is a tool designed for use on a single computer. It locks out intruders to keep the operating system secure. A firewall, like a security system only allows specified traffic through specific doors (ports). A personal firewall will alert the user if anyone ever tries to tamper with the doors and let the user decide who can gain access. The invention takes advantage of the above mentioned firewall feature.

SUMMARY OF THE INVENTION

According to an aspect of the invention, there is provided a system for securely installing patches for an operating system, comprising: a personal firewall, for filtering inbound and outbound network traffic; an operating system update agent, for connecting to an update server via the personal firewall to download patches; a policy manager, for invoking respective policies according to respective stages of the operating system; a stage coordinator, for coordinating the policy manager and the operating system update agent for different stages; and a policy database, for storing respective policies for respective stages of the operating system.

According to another aspect of the invention, there is provided a method for securely installing patches for an operating system, comprising the steps of: in the system startup stage, starting a personal firewall and invoking the startup policy to filter inbound and outbound network traffic; in the system updating stage, invoking an updating policy to connect an operating system update agent to an update server via a personal firewall to download patches; and in the usage stage, invoking a usage policy to let the system work properly; wherein the policies invoked are coordinated according to the respective stages of the operating system to update the operating system.

With the method and system of the invention, the possibility of being infected by malicious software is significantly reduced when downloading patches for the operating system from the Internet.

BRIEF DESCRIPTION OF THE DRAWINGS

The preferred embodiments of the invention will be described herein below with the accompanying figures in which.

DETAILED DESCRIPTION OF THE PREFERRED EMBODIMENTS

Figure 1:
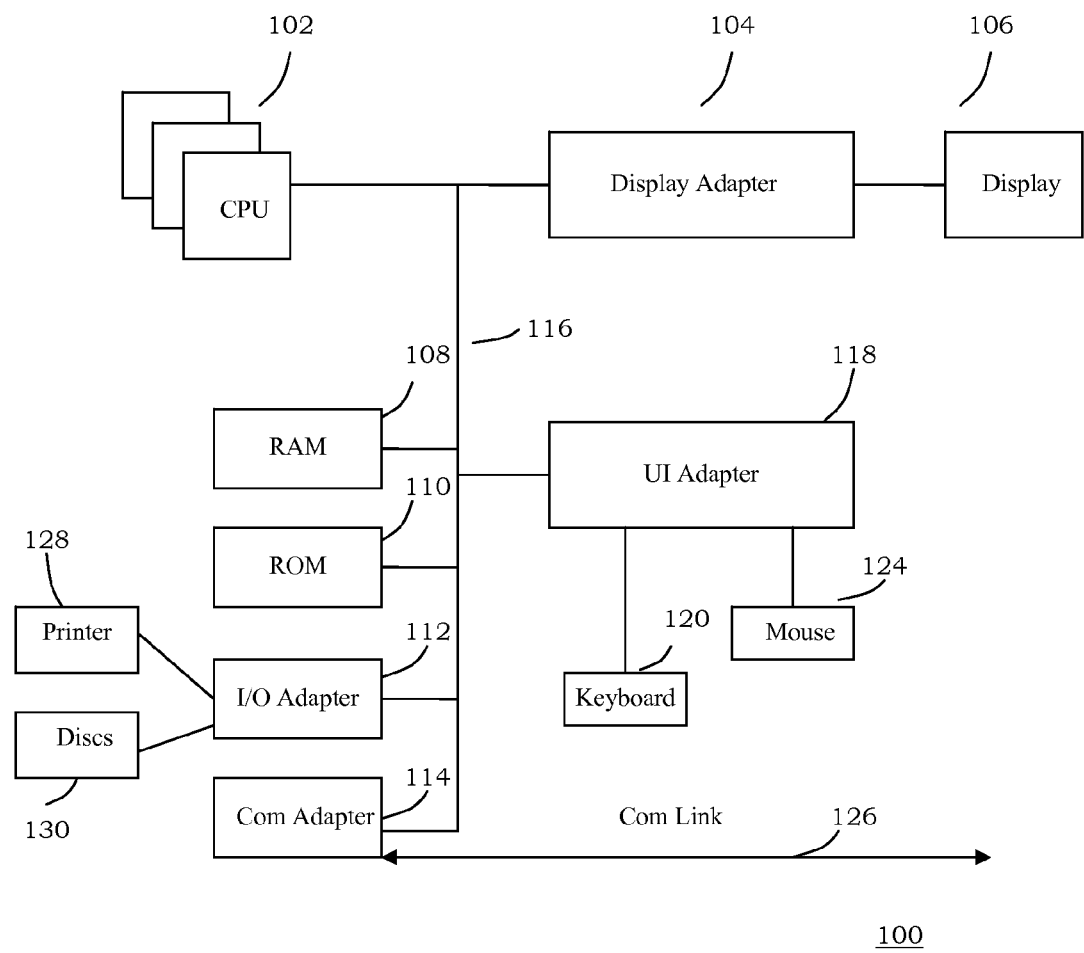
FIG. 1 shows the block diagram of a typical computer system 100 in which the invention could be implemented.

FIG. 1 shows the block diagram of a typical computer system 100 in which the invention could be implemented. The computer system 100 comprises one or more CPU 102 connected to the internal bus 116 which is interconnected with RAM 108, ROM 110 and I/O adapter 112. The I/O adapter 112 supports various I/O devices e.g. printer 128, discs 130 and any other devices (not shown), such as an audio output system. The internal bus 116 links communication adapter 114 to the communication link 126. The UI adapter 118 links various user devices, e.g. keyboard 120, mouse 124 and any other devices not shown, such as a touch screen, a recording pen or a microphone. Display adapter 104 connects the internal bus 116 to the display 106.

To the knowledge of those skilled in the art, the hardware of FIG. 1 could be changed according to the system implementation. For example, the system could have one or more processors, such as an Intel® based Pentium® processor and DSP, or one or more types of memories. Any other devices could be used or substituted for the hardware of FIG. 1 which is only for the purpose of illustration. The example described herein will not limit the scope of the invention.

The invention will be described herein below with the example of a Windows® operating system, but it should be noted that the invention will not be limited to the Windows® operating system, but any systems that need security patches to be protected from mal-ware.

The invention is based on the idea of dividing running of the operating system into three different stages, which are:

the first stage, i.e. startup stage, in which the operating system goes through a boot up process, loading the kernel, starting various drivers. In this stage, the network stack comes up and the personal firewall starts to work;

the second stage, i.e. updating stage, in which the operating system update agent checks system status and communicates with the update server to retrieve the latest patches required, if any, and to download them and apply them;

the third stage, i.e. usage stage, in which the system updating process is accomplished and the user can use the system to do the daily work.

If the latest patches are not installed when the computer starts up, the operating system will likely get infected in the first stage or the second stage. Thus, the invention provides a new method and a system which take advantage of a personal firewall to establish a secure network environment to securely download and install patches, thus the computer is protected from mal-ware even in the first stage and the second stage. After the patches are installed, the system enters the third stage in which users can do the daily work. By way of invoking respective policies according to respective stages, the invention ensures the secure updating process.

Figure 2:
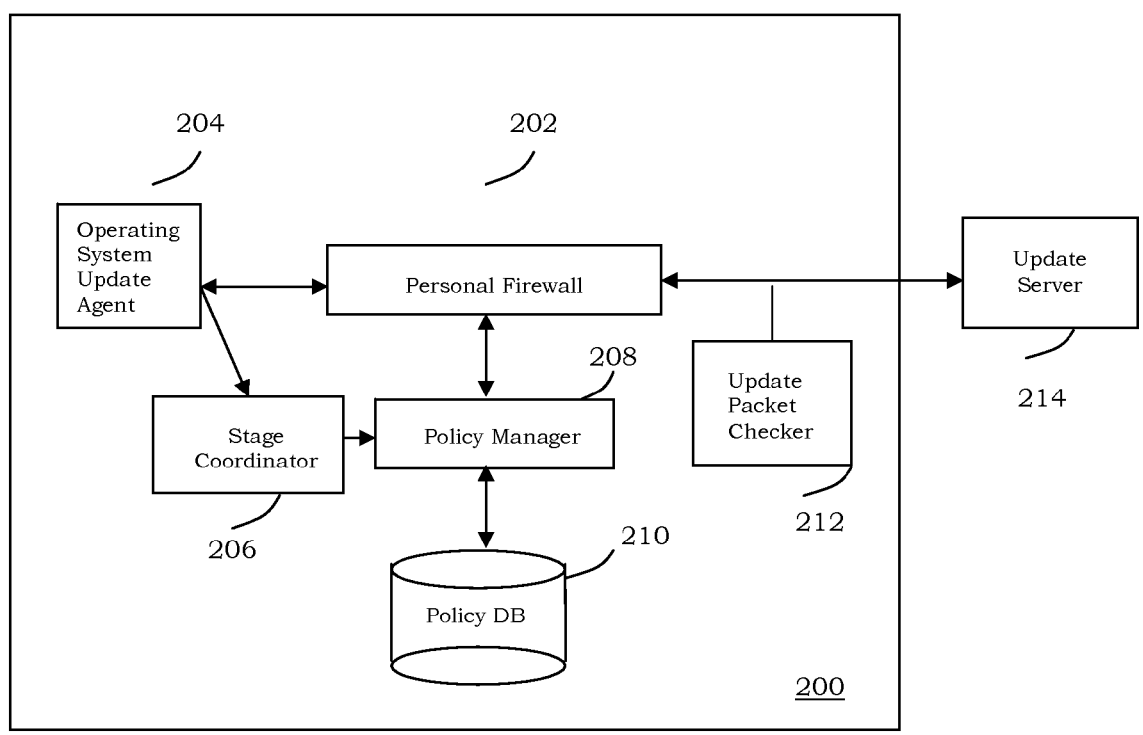
FIG. 2 shows the block diagram of the system 200 for securely installing patches for an operating system according to the invention.

FIG. 2 shows a block diagram of a system 200 for securely installing patches for an operating system according to the invention. The system according to the invention comprises a personal firewall 202, an operating system update agent 204 and a stage coordinator 206. The operating system update agent 204 connects to the personal firewall, via which the operating system update agent 204 connects to the update server 214 to download patches to update the operating system. The personal firewall 202 includes a policy manager 208, which manages the policies stored in the policy database 210 and invokes respective policies according to respective running stages of the operating system in order to securely download and install patches for the operating system. Stored in the policy database 210 are respective policies corresponding to respective stages for securely installing patches for the operating system. According to the preferred embodiment of the invention, these policies include a startup policy, an updating policy and a usage policy. The startup policy is a static policy which is invoked when the operating system boots up, in which only basic network operations such as DNS or DHCP are permitted in order to communicate with the DNS server. No other network traffic is allowed other than the basic network operations. The updating policy is invoked when the operating system enters the updating stage in which, other than the operations allowed in the startup policy, only the operating system update agent 204 is allowed to connect to the update server 214. When entering the usage stage, the usage policy is invoked in which a user can do the daily work as usual. The stage coordinator 206 which communicates with the policy manager 208 and the operating system update agent 204 coordinates the policy invoked by the policy manager according to the respective stages of the operating system. The system 200 further comprises an update packet checker 212 which performs a security check for the update packets in the downloaded patches to ensure that all the packets downloaded are secure. For the Windows Vista® operating system there is provided an interface for performing the security check of packets from the Internet, which could be used to implement the update packet checker 212. In the above-mentioned system, the update packet checker 212 is preferable. The stage coordinator 206, the policy manager 208 and the policy database 210 can be implemented separately or partly or completely in the personal firewall 202.

Figure 3:
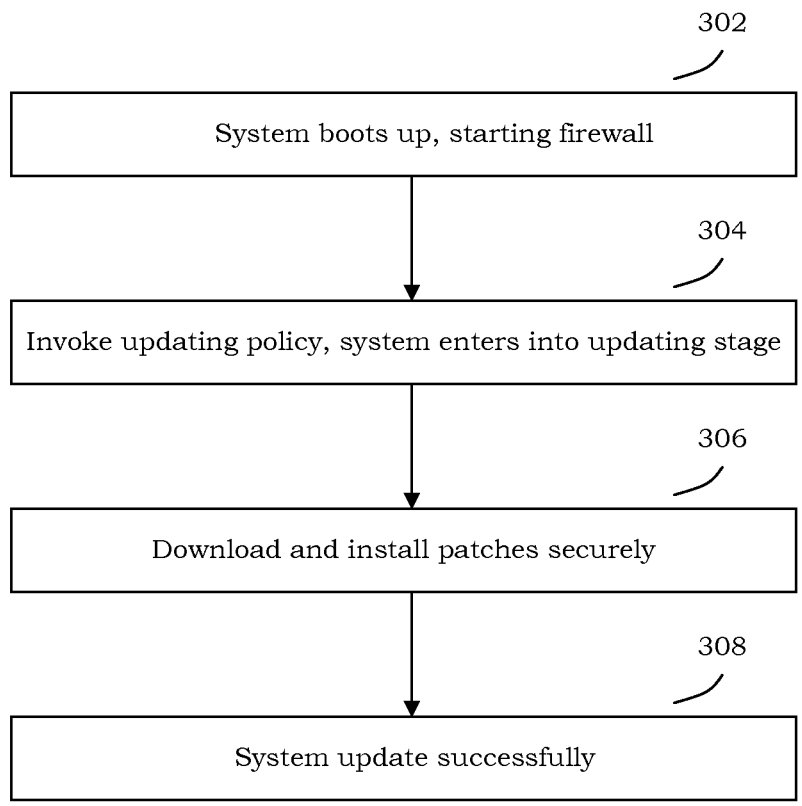
FIG. 3 shows the flow chart of the method 300 for securely installing patches for an operating system according to the invention.

Now the method according to the invention is described with reference to FIG. 3. FIG. 3 shows a flow chart of the method 300 for securely installing patches for an operating system according to the invention.

The method 300 of FIG. 3 starts from step 302 in which the system starts up and enters the startup stage. In the startup stage the system kernel is loaded and various drivers are started. When the network stack is started in the startup stage, the personal firewall 202 is also started to protect the system. The result is that all packets to be delivered to or received from certain services are monitored/filtered/checked. According to a preferred embodiment of the invention, there is provided a static startup policy that controls the network traffic during the startup stage, in which only basic network operations such as DNS or DHCP are permitted in order to communicate with the DNS server. No other network traffic is allowed other than the basic network operations. Therefore, the personal firewall 202 provides a secure environment during the startup stage.

When the stage coordinator 206 is started, the method 300 goes to step 304 in which the startup policy of the personal firewall 202 is completed and the updating policy is invoked by the policy manager 208 from the policy database 210. The updating policy only allows the operating system update agent 204 to connect to the update server 214, other than the basic network operations allowed by the startup policy, thus the operating system is protected from mal-ware. When the stage coordinator 206 informs the operating system update agent 204 that it could start to download patches needed for the operating system update, the method 300 then goes to step 306. In step 306, the operating system update agent 204 downloads and installs all the patches needed. The processes of downloading and installing the patches are the same as in the prior art, and thus will not be described in detail here.

After downloading all of the patches needed, the operating system update agent 204 informs the stage coordinator 206 that the operating system update process is completed. Then the operating system installs the downloaded patches. Preferably, there is provided an update packet checker 212 which performs security checking for all packets in the downloaded patches to ensure the security of the updating process, thereby protecting the operating system further from mal-ware or viruses. For the Windows Vista® operating system there is provided an interface for performing the security check of packets from the Internet, which could be used to implement the update packet checker 212. Alternatively the update packet checker 212 is not provided separately and the security check is performed by anti-virus software installed in the system. With the above-mentioned method, the security of the download patches is further ensured.

After successfully downloading and installing the patches needed, the method according to the invention goes to step 308, in which the stage coordinator 206 informs the policy manager 208 to change the policy in the personal firewall 202 by invoking the usage policy. Because all patches needed for the operating system have been successfully downloaded and installed in the computer, the possibility of infection by mal-ware is significantly reduced. In step 308, the personal firewall 202 is configured to be working under the control of a usage policy, in which the user could do the daily work as usual. In the usage stage, the user can dynamically configure the policy of the personal firewall 202, i.e. the usage policy can be dynamically configured according to the needs of the user.

Although the embodiments of the present invention have been described in detail with reference to the accompanying drawings, these embodiments are only used to illustrate the present invention but not to limit it. Various modifications and changes can be made by those skilled in the art without departing from the spirit and scope of the present invention. Therefore, the scope of the present invention is only defined by the appended claims and the equivalents thereof.

The invention claimed is:

1. A system for securely installing patches for an operating system in a client computer system having the operating system installed thereon, comprising:
   at least one client computer processor device for implementing components;
   a personal client firewall component, being activated at a system startup stage subject to a start-up policy prior to a system usage stage for controlling basic network operations for communicating with an update server and filtering inbound and outbound network traffic; for acting subject to an updating policy during an updating stage to allow an operating system client update agent component to connect only to an update server to download and install patches; and for operating subject to a usage policy after download and installation of patches;
   an operating system client update agent component, for connecting to an update server via the personal firewall to download patches and installing the downloaded patches at a system updating phase prior to a system usage stage in accordance with policies for respective stages of the operating system operation;
   a client policy manager component, for invoking respective policies in the personal client firewall according to respective stages of the operating system;
   a client stage coordinator component, for coordinating the client policy manager component and the operating system update client agent component for different stages, wherein, when the updating policy is invoked by the client policy manager component, the stage coordinator informs the operating system update client agent component that patches can be downloaded and, after downloading of patches, the operating system update client agent component informs the stage coordinator that downloading is complete; and
   a client policy database at a storage device, for storing respective policies for respective stages of the operating system.

2. The system of claim 1, further comprising an update packet checker for performing a security check for the downloaded patches.

3. A method for securely installing patches for an operating system at a client computer system on which the operating system is installed, comprising the steps of:
   in a system startup stage prior to a system usage stage, starting a personal client firewall and invoking a startup policy to control basic network operations to communicate with an update server and filter inbound and outbound network traffic;
   in a system updating stage, a client policy manager component invoking an updating policy in the personal firewall to allow an operating system client update agent to connect only to an update server via the personal client firewall to download and install patches,
   a client stage coordinator component informing the operating system update client agent that patches can be downloaded when the updating policy has been invoked;
   after downloading and installing patches, the operating system update client agent informing the client stage coordinator component that downloading is complete; and
   the client policy manager component changing the policy in the personal client firewall by, in a usage stage, invoking a usage policy to let the system work properly;
   wherein the policies invoked are coordinated according to the respective stages of the operating system to update the operating system.

4. The method of claim 3, further comprising a step of performing security checking for the downloaded patches.

* * * * *